(12) United States Patent
Smyth et al.

(10) Patent No.: US 11,112,533 B2
(45) Date of Patent: Sep. 7, 2021

(54) SYSTEM FOR SENSOR ENABLED REPORTING AND NOTIFICATION IN A DISTRIBUTED NETWORK

(71) Applicant: HARTFORD FIRE INSURANCE COMPANY, Hartford, CT (US)

(72) Inventors: Eugene T. Smyth, Granby, CT (US); Deborah D. Fox, West Hartford, CT (US); Roopak Hooda, Ellington, CT (US); Kristen Sara Mattson, Granby, CT (US); Kristian L. Sanders, Nashville, TN (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 13 days.

(21) Appl. No.: 16/438,041

(22) Filed: Jun. 11, 2019

(65) Prior Publication Data

US 2019/0293837 A1    Sep. 26, 2019

Related U.S. Application Data

(63) Continuation of application No. 14/807,856, filed on Jul. 23, 2015, now Pat. No. 10,330,826.

(51) Int. Cl.
*G01W 1/02* (2006.01)
*G01W 1/00* (2006.01)

(52) U.S. Cl.
CPC ........ *G01W 1/02* (2013.01); *G01W 2001/006* (2013.01)

(58) Field of Classification Search
CPC .................................................... H04W 4/021
See application file for complete search history.

(56) References Cited

U.S. PATENT DOCUMENTS

| | | | |
|---|---|---|---|
| 6,018,699 A | 1/2000 | Baron, Sr. et al. | |
| 8,935,036 B1 | 1/2015 | Christensen et al. | |
| 9,000,921 B2 | 4/2015 | Jordan, II | |
| 2003/0022684 A1 | 1/2003 | Seeger | |
| 2003/0143974 A1 | 7/2003 | Navarro | |
| 2006/0253481 A1 | 11/2006 | Guido et al. | |
| 2009/0109020 A1* | 4/2009 | Tischer | G08G 1/096741 340/539.13 |
| 2011/0218828 A1 | 9/2011 | Mathai et al. | |
| 2012/0029812 A1 | 2/2012 | Altwaijry et al. | |
| 2012/0062392 A1* | 3/2012 | Ferrick | G08G 1/096716 340/905 |
| 2012/0206259 A1 | 8/2012 | Gassaway | |
| 2013/0226624 A1* | 8/2013 | Blessman | H04N 7/183 705/4 |
| 2014/0118112 A1 | 5/2014 | Pugel et al. | |
| 2014/0200903 A1 | 7/2014 | Hancock et al. | |

(Continued)

OTHER PUBLICATIONS

Ortutay, Barbara, IBM's 'Internet of Things' Unit to Offer Insurers Online Data Service, Analysis, Insurance Journal, Apr. 3, 2015.

*Primary Examiner* — Moazzam Hossain
(74) *Attorney, Agent, or Firm* — Volpe Koenig

(57) ABSTRACT

A sensor based system for capturing localized weather data and a server system for communicating with a plurality of reporting and recipient mobile communication devices. The communication devices are enabled to capture additional weather information to supplement the sensor based system.

10 Claims, 10 Drawing Sheets

(56) References Cited

U.S. PATENT DOCUMENTS

| | | | |
|---|---|---|---|
| 2014/0257874 A1* | 9/2014 | Hayward | G06Q 40/00 705/4 |
| 2014/0278573 A1 | 9/2014 | Cook | |
| 2014/0359007 A1 | 12/2014 | Grube | |
| 2014/0368601 A1* | 12/2014 | deCharms | H04W 4/029 348/14.02 |
| 2015/0087259 A1 | 3/2015 | Hinsen | |
| 2017/0116676 A1 | 4/2017 | Blessman et al. | |
| 2017/0193305 A1 | 7/2017 | Apelbaum et al. | |

\* cited by examiner

SYSTEM FOR SENSOR ENABLED REPORTING AND NOTIFICATION IN A DISTRIBUTED NETWORK

CROSS REFERENCE TO RELATED APPLICATION

This application is a continuation of U.S. patent application Ser. No. 14/807,856 filed Jul. 23, 2015, which is incorporated by reference as if fully set forth.

BACKGROUND

Weather data may be captured and analyzed by high level satellites and also more locally by more personalized devices. For example, a personal weather station is a set of weather measuring instruments operated by a private individual, club, association, or even business. The quality and number of instruments can vary widely, and the placement of the instruments is important to obtaining accurate, meaningful, and comparable data, can also be very variable.

Today's personal weather stations typically include a digital console that provides readouts of the data being collected. These consoles may interface to a personal computer where data can be displayed, stored, and uploaded to Web sites or other third party systems.

Weather conditions including wind, hail, tornados, snowstorms, and hurricanes result in billions of dollars of losses each year. Insurance can provide for protection for many of these weather conditions and insurance companies generally have many procedures for handling these tragic events. Changing climate conditions are predicted to increase the severity of certain natural weather losses across various geographic regions in the future. Approximately three out of every five insurance claims for damage are caused by wind and hail, while efficient, accurate and timely notification of these conditions has not been readily available.

Accordingly, it would be desirable to have a system that could provide consumers with real time, accurate and timely warning data to enable proactive protective measures thereby resulting in lower damage rates.

SUMMARY

A system and method for reporting and notifying in a distributed network is disclosed. The system and method provides a warning system to protect insured property. This includes accessing a plurality of devices to acquire weather data, the plurality of devices being spread throughout a geographic area, accessing third party weather data, compiling the third party data and the device acquired data to determine at least one region of threat associated with the weather, correlating the region of threat with insured property to determine property that is endangered by the weather, configuring a warning message to ones of the plurality of devices associated with the endangered property, and transmitting the configured warning message to the ones. The system and method may also include receiving feedback from at least a portion of the ones, the feedback providing evidence that corrective measures were taken to lessen damage to endangered property including wherein the feedback is used to reduce the premiums associated with insurance for the endangered property.

The system and method for receiving weather related information and transmitting electronic warning messages may include an interface for communicating with a plurality of devices to capture data about a weather event, and a processor communicatively coupled with the interface, the processor configured to compile the captured data and determine a region of warning, the processor further configured to identify a plurality of properties associated with the determined region of warning and generate at least one message for delivery via the interface to at least one of the plurality of devices associated with the identified property, the messages providing at least a warning of the weather event affecting the identified property.

A server system for enabling an electronic warning system is also disclosed. The system includes a plurality of devices configured to capture information from a distributed geographic area, a communications interface configured to receive the captured device information, a data store for storing the received device information, and a processor for processing the stored data, the processor configured to generate a series of electronic transmissions messages to selected ones of the plurality of devices based on the processed stored data, the selected ones of the devices associated with a plurality of policyholders who have indicated a preference to receive the electronic transmission messages, the messages associated with protecting certain real property covered in one or more policy documents associated with the policyholders.

The present system and method relate to an apparatus for receiving weather related information and transmitting electronic warning messages, the apparatus comprising: a communications interface for communicating with a plurality of sensor devices, the sensor devices enabled to capture at least temperature, wind, precipitation and barometric pressure data; the communications interface further enable to communication with a plurality of mobile communication devices, the mobile communication devices providing supplemental weather related information to the communications interface; a processor in communications with the communications interface, the processor configured to compile the data from the plurality of sensor devices and mobile communication devices; the processor further configured to select a plurality of validated recipients and generate a plurality of electronic transmission messages for delivery via the communications interface to a plurality of receiver devices associated with the validated recipients, the transmission messages providing advance warnings of a weather condition affecting property associated with the validated recipient; a storage device in communication with the processor to communication device for storing the sensor data, the transmission data and the recipient data.

The system and method also relate to a server system for enabling electronic warning messages to a plurality of receiver devices, the system comprising: a plurality of sensor devices configured to capture information from a distributed geographic area; a plurality of mobile communication devices configured to supplement the sensor devices; a communications interface configured to capture the sensor device and mobile communication device data; a data store for storing the captured sensor device and mobile communication device data; and a processor for processing the stored data; the processor configured to generate a series of electronic transmissions messages to a plurality of electronic receiver devices based on the processed stored data, the electronic receiver devices associated with a plurality of policyholders who have indicated a preference to receive the electronic transmission messages, the messages associated with protecting certain real property covered in one or more policy documents associated with the policyholders.

The system and method also relate to a wireless device capable of having a plurality of operating modes, the wireless device comprising: an integrated device capable of toggling between a reporting mode and a warning mode; and a processor operatively coupled to the integrated device, the processor adapted to determine whether a change of at least one state of weather has occurred based upon weather factors, the processor also adapted to change a first reporting operating mode of the plurality of operating modes of the wireless device, to a second warning operating mode of the plurality of operating modes of the wireless device.

BRIEF DESCRIPTION OF THE DRAWINGS

A more detailed understanding may be had from the following description, given by way of example in conjunction with the accompanying drawings wherein.

DETAILED DESCRIPTION

Disclosed herein are processor-executable methods, computing systems, and related technologies for the processing and analysis of sensor data for communicating electronic warning messages to a distributed network of mobile devices. The present system leverages a distributed network of independent sensor endpoints including mobile devices, automobiles, and Personal Weather Stations (PWS) to collect data regarding weather conditions and provide the data to a central server in order to deliver electronic notification messages, allowing users to take proactive measures to protect themselves and property such as automobiles, homes, business and other property. Proactive preventative steps can reduce loss to the user, where reduced loss equates to less claims and thus substantial administrative and cost savings to an insurer to thereby lessen costs to the consumers.

Figure 1:
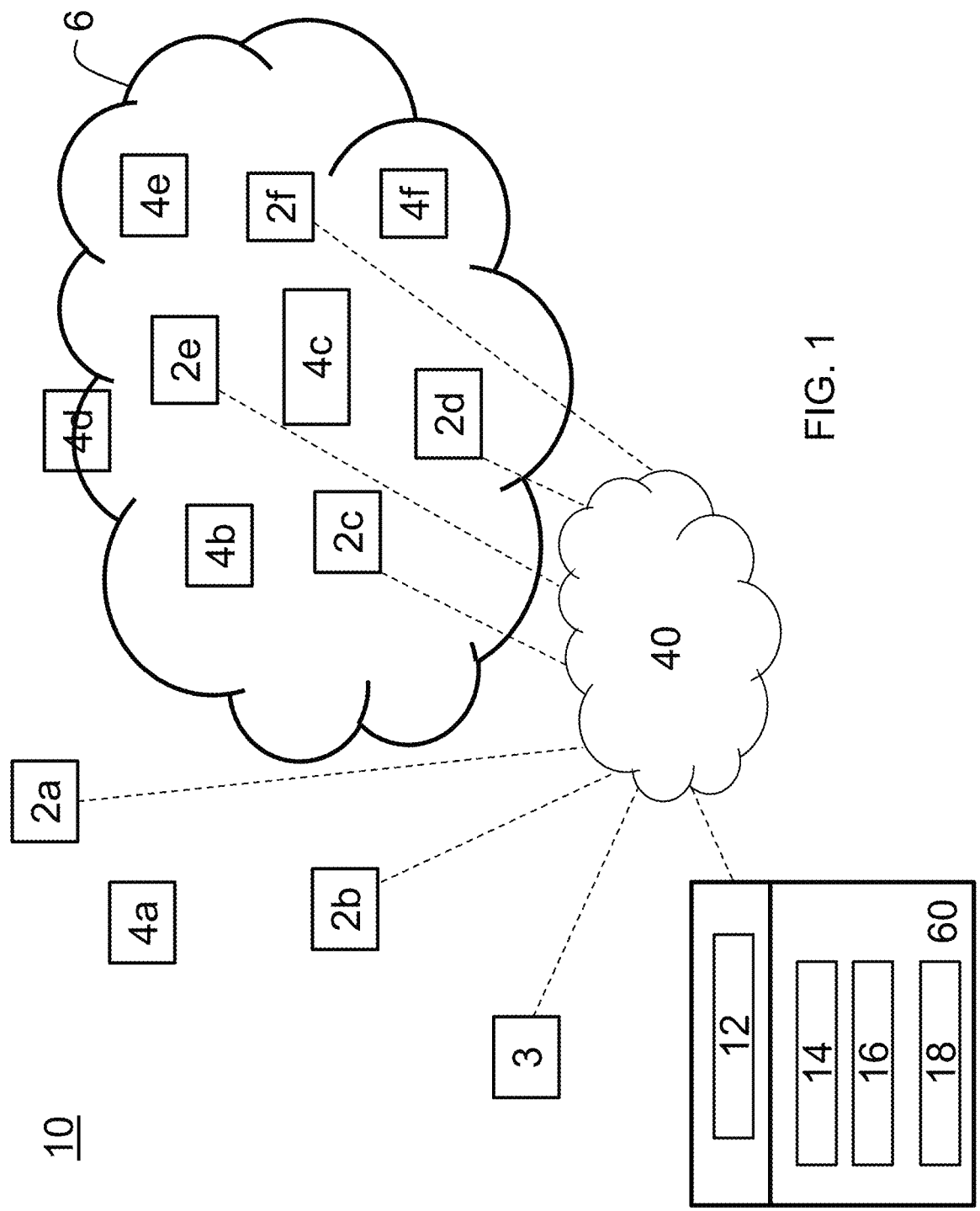
FIG. 1 illustrates a block diagram of the system for sensor enabled reporting and notification in a distributed network that may be used for weather data administration and management.

FIG. 1 illustrates a block diagram of the system 10 for sensor enabled reporting and notification in a distributed network that may be used for weather data administration and management. System 10 includes a plurality of devices 2a-f that sense data and provide this data to system 10 and/or that receive alert information based on the data in system 10. Ones of the plurality of devices 2a-f may take the form of a mobile communications device, such as a smartphone. Other examples of devices 2a-f may include weather vanes, weather systems, smart cars, radar and barometers, for example. Devices 2a-f may be located within a weather event 6, such as devices 2c-2f, or outside of a weather event 6, such as devices 2a and 2b.

Ones of the plurality of devices 2a-f may sense or otherwise collect data about a weather event and provide the data to subsystem 60 via network 40 or any other communication path. This data may include providing criteria of weather that is occurring in the vicinity of devices 2a-f. For example, device 2a may provide information that it is experiencing sunny conditions. Device 2f may provide criteria including wind speed, such as 100 m.p.h. winds, which may be indicative of a tornado, rainy conditions, such as by providing rain accumulation. Flooding conditions may also be indicated, such as accumulation of several inches of water.

System 10 may allow ones of the plurality of devices 2a-f to act as sensor points, alert devices and for providing the location of insured properties 4a-f. Further, ones of the plurality of devices 2a-f may also act to provide feedback associated with corrective action taken by the insured to protect properties 4a-f from event 6, as will be described herein. This may include using devices 2a-f as a weather device to provide information to subsystem 60, using devices 2a-f as a location device associated with properties 4a-f, using devices 2a-f as an alert device to alert a user of a weather event 6 germane to properties 4a-f, and using devices 2a-f as a feedback device to demonstrate the taking of preventative measures to protect properties 4a-f from weather event 6.

Subsystem 60 may receive information and data from weather service 3. While a single weather service 3 is shown in FIG. 1, it is understood that several or multiple weather services 3 may be incorporated within system 10. For example, the National Weather Service (NWS) is a component of the National Oceanic and Atmospheric Administration (NOAA). NOAA is an Operating Unit of the U.S. Department of Commerce. NWS provides weather, water, and climate data, forecasts and warnings for the protection of life and property and enhancement of the national economy. NWS is located in Silver Spring, Md., with regional headquarters located in Kansas City, Mo.; Bohemia, N.Y.; Fort Worth, Tex.; Salt Lake City, Utah; Anchorage, Ak.; and Honolulu, Hi. NWS provides a national infrastructure to gather and process data worldwide. Each year, NWS collects some 76 billion observations and issues approximately 1.5 million forecasts and 50,000 warnings. NWS provides active alerts including warnings by state, excessive rainfall and winter weather forecasts, river flooding, latest warnings, thunderstorm/tornado outlook, hurricanes, fire weather outlooks, UV alerts, drought, and space weather. NWS provides forecasts at a local level, international forecasts, severe weather, current outlook maps, drought, fire weather, fronts/precipitation maps, current graphical forecast maps, rivers, marine, offshore and high seas, hurricanes, aviation weather, and climatic outlook. All of these forecasts and active alerts may provide data to data subsystem 60. In addition, NWS may provide current conditions such as, radar, climate monitoring, river levels, observed precipitation, surface weather, upper air, marine and buoy reports, snow cover, satellite, space weather, and international observations. Past weather may also be reported by NWS in order to provide a framework for interpreting and predicting current and future conditions, such as past weather, climate monitoring, heating/cooling days, monthly temps, records, astronomical data, and certified weather data.

Additional or alternative weather services may also be used. This includes local college weather centers, regional weather centers, weather services performed by local television stations, and the like.

Weather service 3 may include spotters and other data flows to provide information to the weather services. This data may be provided via devices 2a-f. For example, NWS utilizes a weather spotter program where individuals may be trained to spot weather and provide feedback on the spotted weather. This may include reporting criteria meeting severe weather directly to the NWS district office via a spotter webpage or telephone call, each of which may be accessed via devices 2a-f. The NWS may also proactively reach out to spotters for live reports when severe weather is indicated on radar, for example. Spotters may provide information on certain criteria such as tornados/funnel clouds, wall clouds that are rotating, hail from ⅛" to severe 1" in size, winds greater than 40 m.p.h., winds damaging trees, lines, and buildings, rainfall greater than 1" per hour or 2" per storm, and flooding such as 6 or more inches of water on roads.

Weather service 3 may be tied back to the devices 2a-f as well. That is, the location of devices 2a-f may be used by weather service 3 to provide warnings of impending weather and these warning and associated weather may be provided to subsystem 60 as data. For example, many people subscribe to weather alerts on their respective devices 2a-f. When their devices 2a-f is within an alert area, devices 2a-f registers an alert. While not only providing information to a user, devices 2a-f may then provide this information to subsystem 60.

System 10 includes a plurality of properties 4a-f. As shown there are multiple single properties 4a-f, shown for convenience, while it is understood that many such properties 4a-f may be included within system 10. Properties 4a-f may be included within other properties 4a-f, such as when an automobile is included within a garage of a house, for example. Properties 4a-f may take the form of any insurable properties, such as a person, automobile, building, residence, or the like.

Some properties 4a-f are non-moveable or non-mobile. This may include properties 4a-f such as a house, for example. Locating this type of non-moveable properties 4a-f may be fairly straight forward as the address and/or location of the property may be provided and known. The location is necessary in determining whether the properties 4a-f are experiencing a weather risk.

Other types of properties 4a-f may be movable and their specific location may need to be determined or estimated. Movable properties 4a-f may include people, automobiles, boats, and planes, for example. Properties 4a-f of this type may be located in any number of ways including using a devices 2a-f associated with the properties 4a-f in order to locate the properties 4a-f. The property may be included in a system of the internet of things and therefore able to be identified and locate it. Other techniques for locating properties 4a-f may also be sued. For example, if one of the properties 4a-f is a person, the location of the person's phone may provide information to locate the person, as people generally keep their phones with them. Further, an automobile may be able to provide information on its location such as through a communication means like OnStar™, for example. Other means for automobile, boats and planes to communicate include systems that provide feedback on driver performance such as telematic systems. In addition to locating property, a telematic system may be utilized to provide data associated with the property itself. For example, systems in cars can activate the windshield wipers based on sensed precipitation, and since these systems can sense the precipitation, these systems can further provide feedback regarding the location of the vehicle and the amount of precipitation, for example.

A first order determination of the location of properties 4a-f may be made as described above. In addition, the movement of properties 4a-f may be considered. This may include a second order vector of direction and velocity to determine future positions or the path of properties 4a-f. In addition or in the alternative, in the case of a car, for example, a destination and/or path may be determined from the mapping system of the vehicle or the phone of the driver, such as devices 2a-f. Such information may enable a determination of the future location of properties 4a-f to enable system 10 to better protect and provide a warning regarding properties 4a-f.

FIG. 1 illustrates a weather event 6. Weather event 6 may include any weather or otherwise measurable event that impacts insured property. Weather event 6, fundamentally, is the state of the atmosphere, to the degree that it is hot or cold, wet or dry, calm or stormy, clear or cloudy. Weather event 6 may take the form of: storms including a blizzard, cloud, downburst, dust storm, extra tropical cyclone, firestorm, ice storm, lightning, supercell, thunderstorm (including thunder snow), tornado, tropical cyclone (including hurricane), waterspout, and winter storm; precipitation, including drizzle (freezing drizzle), graupel, hail, ice pellets, rain (freezing rain), snow (rain and snow mixed, snow grains, snow roller, slush); air pollution; smog; cold wave; fog; heat wave; and other sever weather. While a single weather event 6 is shown in FIG. 1, many weather events 6 may be included and tracked within system 10. This may include a weather event 6 that produces rain, sleet, thunder and lightning, for example. Additionally, weather event 6 may include a tornado, for example.

Weather service 3 may be used to determine the first order location of weather event 6, as well as feedback from devices 2a-f. In addition, future weather and past weather may be used to predict the movement of weather event 6 to provide increased warning and protection to properties 4a-f located or expected to be located in the path of weather event 6.

As discussed herein, devices 2a-f and weather service 3 may provide information and data to subsystem 60. The data may be provided via network 40, for example. Subsystem 60 may receive the data using a communications interface 12. Once the data is received by subsystem 60, the data may be compiled by a compiler 14 within subsystem 60. The compiled data may be correlated using a correlator 16 of subsystem 60. Once correlated, a configurer 18 may configure a plurality of warning messages to be provided to one or more users via devices 2a-f and/or properties 4a-f. These messages may be transmitted via network 40 to the one or more users via devices 2a-f and/or properties 4a-f.

The message may include a warning that weather event 6 is in the vicinity of properties 4a-f. The message may provide suggested remedial measures that may be taken to prevent damage to properties 4a-f.

Responsive to the message or more generally to the weather event 6, a property owner may employ preventive measures, either their own or those suggested in the message, or both, to prevent damage to properties 4a-f. This may include moving an automobile into a garage to prevent damage from hail, elevating property within a house to prevent water damage from rising flood waters, and the like. Devices 2a-f may be utilized to capture and report remedial measures taken, such as by taking a picture of the automobile located in the garage or the personal items stacked in elevated positions. These pictures and associated data may be transmitted to subsystem 60 and may demonstrate and document preventive measures that may be rewarded with lower insurance rates for properties 4*a-f*.

Figure 2:
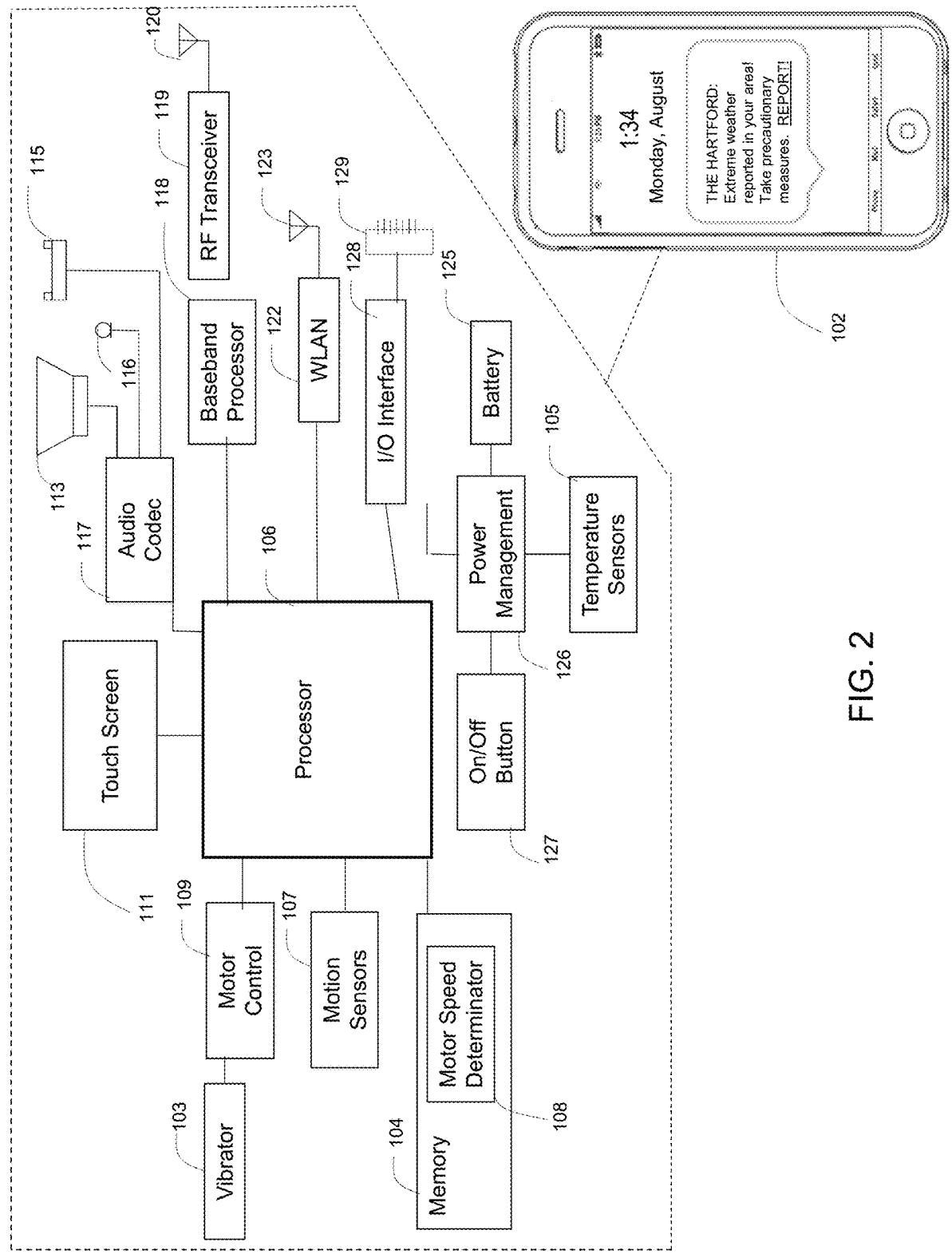
FIG. 2 shows an exemplary computer architecture for the sensor and alerting device of the system of FIG. 1.

FIG. 2 shows a multi-function mobile communications device 102 (also referred to here as a mobile communications device) operated by an end user (owner/operator) of the device 102. Device 102 is an example of one type of devices 2*a-f*. In one instance, the device 102 is a smart phone or a cellular phone with several features typically available in modern wireless communication devices, such as a touch screen interface, music, video file recording, playback, digital camera, and wireless-enabled applications such as voice over internet protocol telephony, electronic calendar, web browser, and email. In another instance, the device 102 may be a larger, tablet-like computer such as an iPad™ device by Apple Inc. or other similar portable multi-function communication device.

FIG. 2 shows a functional unit block diagram including constituent hardware components of the mobile communications device 102, e.g. as found in an iPhone™ device by Apple Inc. Although not shown, the device 102 has a housing in which the primary mechanism for visual and tactile interaction with its user is a touch sensitive display screen (referred to here as a touch screen) 111. The housing may be essentially a solid volume and alternatively, the housing is one that has a moveable, multi-piece housing, such as a clamshell design, or one with a sliding, physical keypad as used by other cellular and mobile handset or smart phone manufacturers. The touch screen 111 is used to display typical features of visual voicemail, web browser, email, and digital camera viewfinder, as well as others, and to receive input from the user via virtual buttons and touch commands.

For wireless telephony, which enables the user to receive and place audio and/or video calls, downlink audio during a call can be emitted from a speaker 113 (which may be an earpiece speaker or receiver, or it may be a headset earphone). Uplink audio includes the user's speech, which is picked up by a microphone 116 (e.g., mouthpiece microphone or headset microphone). Conversion between analog domain and digital for the speaker and microphone signals, in addition to digital audio signal processing for different applications running in the device 102, may be performed within audio codec 117. A physical volume switch or button 115 may also be connected to the codec. The codec 117 may be configured to operate in different modes, e.g. to service a digital media player function (such as an MP3 player that is playing back a music file that is stored in the device 102), as well as a wireless telephony function.

For wireless telephony, a baseband processor 118 is included to perform speech coding and decoding functions upon the uplink and downlink signals, respectively, in accordance with the specifications of a given protocol, e.g. cellular GSM, cellular CDMA, wireless voice over IP (VOIP). A cellular radio frequency (RF) transceiver 119 receives the coded uplink signal from the baseband processor and up converts it to a carrier band before driving an antenna 120 with it; it receives a downlink signal from the antenna 120 and down converts the signal to baseband before passing it to the baseband processor 118. A wireless local area network transceiver 122 receives and transmits data packets from a nearby wireless router or access point, using an antenna 123.

Power is provided to operate the components shown in FIG. 2 using a battery 125 that may be rechargeable or replaceable. The battery 125 is charged or replenished by an external power source such as a wall plug or automobile battery dc power adapter (not shown) that connects to a multi-pin docking connector 129 that is also integrated in the housing of the device 102. The connector 129 and its associated charger and input/output (I/O) interface circuitry 128 may be in accordance with any suitable computer peripheral specification such as Universal Serial Bus (USB). The USB protocol allows for the connector 129 and its associated interface circuitry 128 to be used for both power transfer to recharge the battery 125 and for data I/O communications. The latter includes docking functions, to synchronize user content in the device 102 with another computer device owned by the user that may have substantially more data storage capacity, e.g. a desktop computer, a laptop/notebook computer.

The personal mobile communications device 102 may include a power management unit (PMU) 126. The PMU 126 is typically implemented as a programmed processor, with associated analog and digital conversion circuitry, analog signal conditioning circuitry, and a data communications interface needed to control or communicate with other components of the device 102. The PMU 126 obtains temperature data or temperature readings from multiple temperature sensors 105, and then processes that data to make decisions that affect power consumption activity, in order to maintain specified thermal levels for the device 102. The PMU 126 may include power supply circuitry with various regulated voltage outputs for supplying power to the components of the device 102. The PMU 126 may also be tasked with the orderly powering down and powering up the various components of the device 102, in response to system reset or the main power on/off button 127 being actuated by the user.

The device 102 also includes a motion sensor 107 which may use an accelerometer to measure linear acceleration of the device 102 along a given axis. Motion sensor 107 may use a MEMS type mechanical sensor or gyroscope to measure turn rate or angular velocity of the device 102 about a given axis. Motion sensor 107 may be integrated with the vibrator 103 the same integrated circuit die or alternatively in the same integrated circuit package.

The user-level functions of the device 102 are implemented under control of a processor 106 that has been programmed in accordance with instructions (code and data) stored in memory 104. The processor 106 and memory 104 are generically used here to refer to any suitable combination of programmable data processing components and data storage that conduct the operations needed to implement the various functions of the device 102. The processor 106 may be an applications processor typically found in a smart phone, while the memory 104 may refer to microelectronic, non-volatile random access memory. An operating system may be stored in the memory 104, along with application programs specific to the various functions of the device, which are to be run or executed by the processor 106 to perform the various functions of the device 102. For instance, there may be a telephony application that (when launched, unsuspended, or brought to foreground) enables the user to "dial" a telephone number to initiate a telephone call using a wireless VOIP or a cellular protocol and to "hang up" on the call when finished. The vibrator 103 is driven by motor control 109 which drives the vibrator at designated voltages based on a motor speed determinator module 108. Device 102 may be used to receive electronic warning messages as well as provide weather information to an insurance network.

Figure 3:
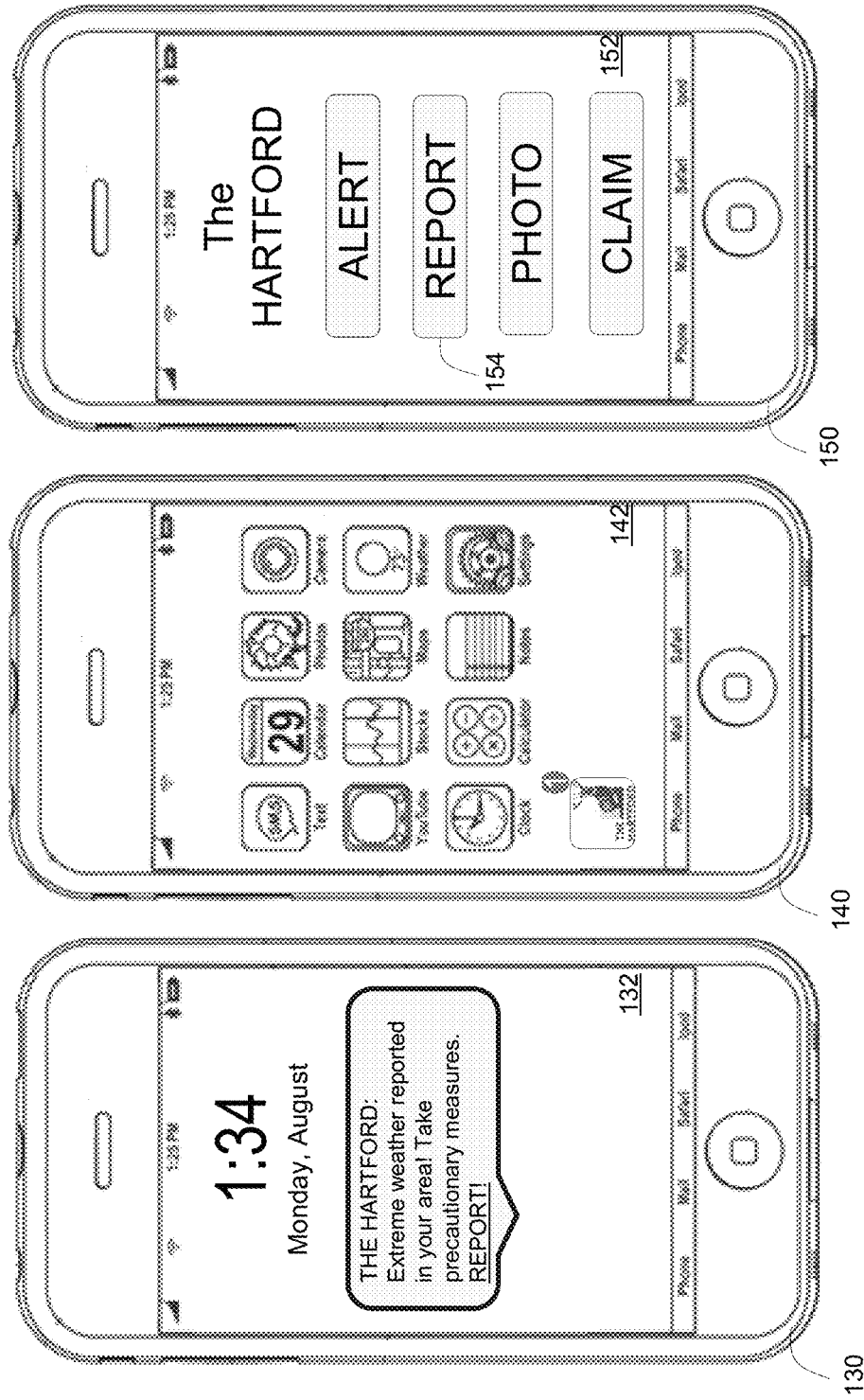
FIG. 3 shows exemplary system screen displays of the system and method of FIG. 1.

FIG. 3 illustrates a series of exemplary screen configurations of system 10 as discussed with respect to FIG. 1 that may be depicted on device 102. Screens 130, 140 and 150 may be representative of one or more mobile devices that may be configured with an application program or application that causes the mobile device to provide user prompts, such as in the form of fields on a screen display, for users to provide commentary/additional detail. The application may be configured to cause the mobile phone to automatically obtain satellite data, if available, and append Geographic Information System (GIS) or other location data to photos. The application may be configured to be activated responsive to a communication sent to the mobile device, such as from an insurance company system, via text message, e-mail or otherwise. The application could be configured to be activated by the user, or may be configured to monitor data received by one or more applications, text messages or the like for activation. For example, the application may automatically activate responsive to receipt of text messages from emergency management personnel, weather application data indicative of tornado or hurricane warnings or other thresholds, or news application data indicating key words such as tornado, hurricane, flooding, wildfire associated with geographic indicators such as city, county, neighborhood, region or landmark names. The application may alert the insured by for example, providing the user with an alert and allowing the user to view their own property based on personal weather station data having location data correlated with property location data or provide a virtual walk-thru of their own neighborhood afflicted by the weather.

Screens 130, 140 and 150 are configured to interface with a requesting user such as an insurance company employee for administering and managing claims related to weather events. Screen 130 includes a visual representation 132 of a first instance of a warning message, screen 140 includes a visual representation 142 of a second instance of a warning message indicator and screen 150 includes a visual representation 152 of a third instance of a warning message interface screen where a user may see a warning message, report a weather condition, capture a photo of a weather related claim item or a weather condition and initiate or activate a claim, such as with an insurance company. Activating button 154 may initiate a first notice of loss procedure with an insurance company.

Figure 4:
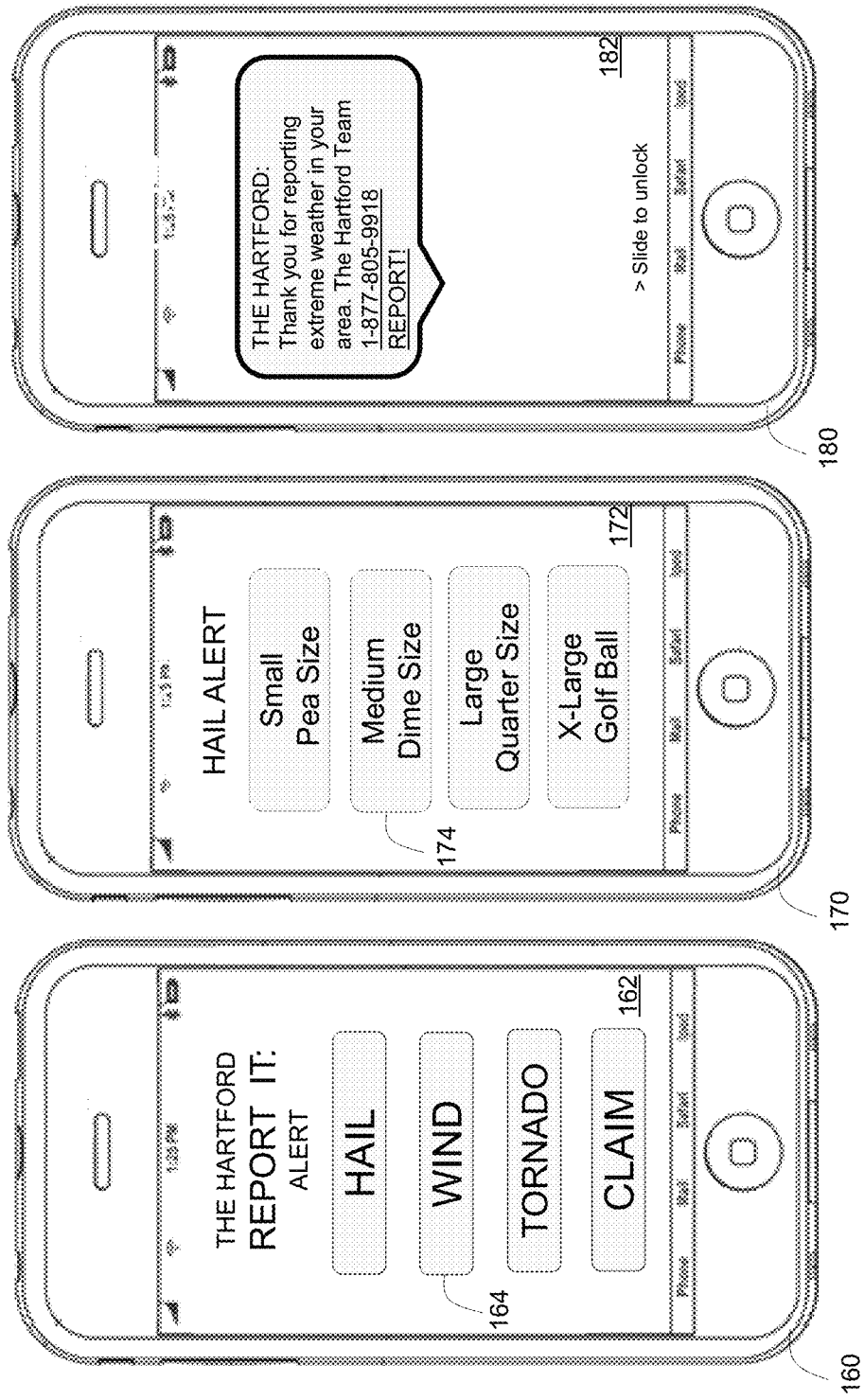
FIG. 4 shows exemplary system screen displays of the system and method of FIG. 1.

FIG. 4 illustrates another series of exemplary screen configurations of system 10 as discussed with respect to FIG. 1 that may be depicted on device 102. Screen 160 includes a visual representation 162 of a first instance of a reporting interface. Visual representation 162 may include one or more buttons 164 used for reporting a weather condition such as hail, wind, tornado and/or activating or reporting a claim. Screen 170 includes a visual representation 172 of a second instance of a reporting interface that may be a sub-menu of screen 160. Screen 170 may include one or more buttons 174 that allow the user to provide additional data on the weather condition such as a size of a hail particle. Screen 180 includes a visual representation 182 of a third instance of a reporting interface that provides information messages, such as a confirmation message related to a weather condition.

Figure 5:
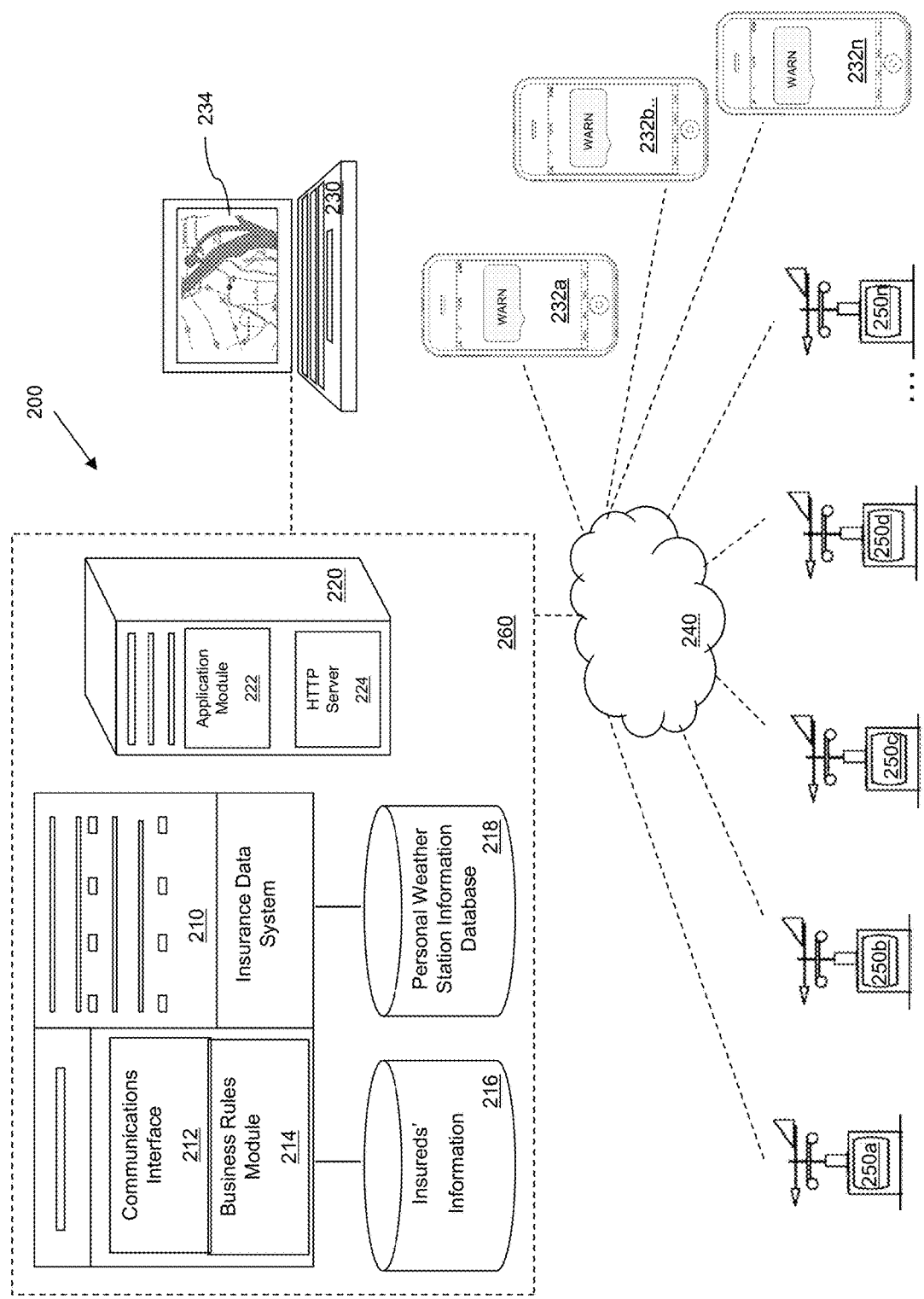
FIG. 5 shows an exemplary depiction of the system of FIG. 1 that may be used for the management of weather and warning data.

FIG. 5 shows an example system architecture 200 that may be used for the administration and management of weather claims using personal weather station data merged with insurance company insureds' data. The example architecture 200 includes an insurance data system 210, a web system 220, an insurance terminal 230, user devices 232a-n, a network 240, and a plurality of third party web based systems 250a-n. Third party web based systems 250a-n may be PWSs, and may have the following instruments: a Thermometer for measuring air and sea surface temperature; a Barometer for measuring atmospheric pressure; a Hygrometer for measuring humidity; a wind vane for measuring wind direction; an Anemometer for measuring wind speed; a Rain gauge for measuring liquid precipitation over a set period of time. In addition, additional instruments may be employed, including: a Present Weather/Precipitation Identification Sensor for identifying falling precipitation; a Disdrometer for measuring drop size distribution; a Transmissometer for measuring visibility and a Ceilometer for measuring cloud ceiling.

Additional devices may also measure the ultraviolet index, solar radiation, leaf wetness, soil moisture, soil temperature, water temperature in ponds, lakes, creeks, or rivers, and occasionally other data.

Insurance data system 210 may include a communications interface 212, an insurance rules processor 214, an insureds information database 216 and personal weather station information database 218 that comprise an insurance company subsystem 260. In one configuration, insurance terminal 230, user devices 232a-n, third party web based systems 250a-n and insurance company subsystem 260 are in communication via a network 240. Insurance company subsystem 260 shown in FIG. 5 is a subsystem that might be implemented solely within the corporate office headquarters of a financial services/insurance company or be an aggregation of one or more other subsystems including one or more partner, third party administrator and/or vendor subsystems to allow communications and data transfer between the insurance company and claims representatives, adjusters, insurance customers, and insurance agents. Data transferred through network 240 to insurance subsystem 260 may pass through one or more firewalls or other security type controls implemented within web system 220 and/or in standalone devices. The firewall allows access to network 240 through predetermined conditions/ports. The firewall may restrict the Internet Protocol (IP) addresses that may access web system 220.

In operation, insurance data subsystem 260 may implement technology to search via network 240 for data such as personal weather station data in the form of weather data, digital photographs and associated location based information on third party weather stations 250a-n. Insurance data subsystem 260 may also communicate with user devices 232a-n to obtain data supplemental weather data directly from one or more users in a distributed or crowd sourced fashion.

Business rules module 214 may include one or more business rules and one or more predictive models in conjunction with one or more software modules or objects and one or more specific-purpose processor elements to perform the processing required by embodiments such as for selecting users to transmit weather warnings to by reviewing locational and policyholder information.

The insureds' information database 216 may store information, data and documents that relate to insureds' policies such as home, business and/or automobile related policy information as well as location information. Personal weather station information database 218 may store information, data and documents from user devices 232a-n and third party systems 250a-n. Insureds' information database 216 and personal weather station information database 218 may be spread across one or more computer-readable storage media, and may be or include one or more relational databases, hierarchical databases, object-oriented databases, one or more flat files, one or more spreadsheets, and/or one or more structured files. Insureds' information database 216 and personal weather station information database 218 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the insurance data system 210 and the other elements in the example architecture 200 of FIG. 5 may be performed via the interface module 212 interacting within insurance data subsystem 260. The insurance data subsystem 260 may access and communicate with user devices 232a-n and third party systems 250a-n via interface module 212.

Web system 220 may provide a web interface that may be accessed directly by a user such as an insured, a claims representative, an insurance adjuster and other third party entity employing user devices 232a-n to communicate and interact with an insurance company representative employing terminal 230. In certain embodiments, user devices 232a-n and terminal 230 can include, but are not limited to cellular telephones, other wireless communication devices, personal digital assistants, pagers, laptop computers, tablet computers, smartphones, other mobile display devices, or combinations thereof. Devices 232a-n and terminal 230 may communicate with the web site system 220 that may be operated by, or under the control of, an insurance entity or other third party entity such as an outsourced type entity or third party administrator type entity. The web site system 220 may generate one or more web pages for access by client devices 232a-n and requesting user device 232, and may receive responsive information from client devices 232a-n such as certain requested coverage and policy information. The web site system 220 may then communicate this information to the insurance data system 210 for processing via communications interface 212.

In operation, devices 232a-n and terminal 230 may be used to update insureds about the status of their claim, condition of their property, provide payments and settlements, and other claims related activities. The web site system 220 may include a web application module 222 and a HyperText Transfer Protocol (HTTP) server module 224. The web application module 222 may generate the web pages that make up the web site and that are communicated by the HTTP server module 224. Web application module 222 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 224 may implement the HTTP protocol, and may communicate HyperText Markup Language (HTML) pages and related data from the web site to/from client devices 232a-n and 230 using HTTP. The HTTP server module 224 may be, for example, a Sun-ONE Web Server, an Apache HTTP server, a Microsoft Internet Information Services (IIS) server, and/or may be based on any other appropriate HTTP server technology. The web site system 220 may also include one or more additional components or modules (not depicted), such as one or more switches, load balancers, firewall devices, routers, and devices that handle power backup and data redundancy.

One or more of the client devices 232a-n such as client device 232a may include a web browser module 234 (not shown), which may communicate data related to the web site to/from the HTTP server module 224 and the web application module 222 in the web site system 220. The web browser module 234 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 234 may implement Rich Internet Application (RIA) and/or multimedia technologies such as Adobe Flash, Microsoft Silverlight, and/or other technologies. The web browser module 234 may implement RIA and/or multimedia technologies using one or web browser plug-in modules (such as, for example, an Adobe Flash or Microsoft Silverlight plugin), and/or using one or more sub-modules within the web browser module 234 itself. The web browser module 234 may display data on one or more displays that are included in or connected to the client device 232a, such as a liquid crystal display (LCD) display, organic light-emitting diode (OLED) display, touch screen or monitor. The client device 232a may receive input from the user of the client device 232a from input devices (not depicted) that are included in or connected to the client device 232a, such a mouse or other pointing device, or a touch screen, and provide data that indicates the input to the web browser module 234.

The example architecture 200 may also include one or more wired and/or wireless networks within subsystem 260 via which communications between the elements and components shown in the example architecture 200 may take place. The networks may be private or public networks, cloud or shared networks and/or may include the Internet.

Each or any combination of the components/modules 212, 214, 222, and 224 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 5, these modules 212, 214, 222, and 224 may perform functionality described later herein.

Figure 6:
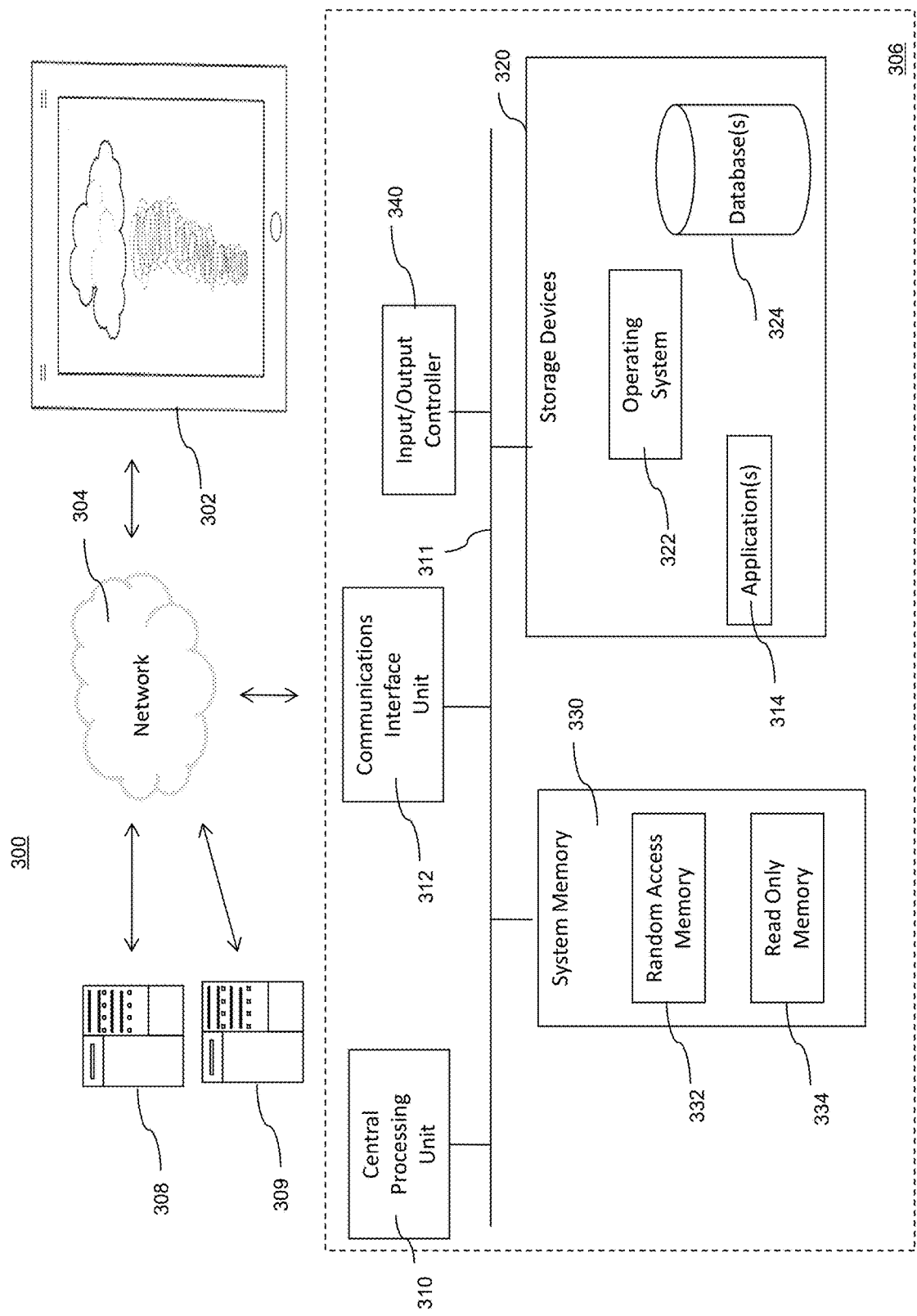
FIG. 6 shows exemplary system of the system and method of FIG. 1.

Referring to FIG. 6, an exemplary computer system 300 for with the system and method described herein. Computer system 300 may be configured to perform weather claims evaluation and management for one or more insurance companies and their associated agents, personnel, customers and staff using devices 302. System 300 may include device 302, which may be an insurance company terminal or device, a network 304, an insurance processing and data system 306 and one or more third party servers 308 and 309. Insurance processing and data system 306 is responsible for the processing of weather related data such as image and text data, including personal weather station based data, from third party servers 308 and 309 to combine such data with insured customer information in order to make claims related decisions. In insurance processing and data system 306, a central processing unit or processor 310 executes instructions contained in programs such as policy management application program 314, stored in storage devices 320. Processor 310 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 320 may include suitable media, such as optical or magnetic disks, fixed disks with magnetic storage (hard drives), tapes accessed by tape drives, and other storage media. Processor 310 communicates, such as through bus 311 and/or other data channels, with communications interface unit 312, storage devices 320, system memory 330, and input/output controller 340. System memory 330 may further include non-transitory computer-readable media such as a random access memory 332 and a read only memory 334. Random access memory 332 may store instructions in the form of computer code provided by application 314 to implement the present embodiment. One or more computer programs may be stored in memory, or computer usable media, such as storage devices 320 and random access memory 332, in the form of computer readable program code adapted to be executed by at least one processor, such as a processor 310. The one or more computer programs may include instructions for performing steps of methods of embodiments described herein. System 300 further includes an input/output controller 340 that may communicate with processor 310 to receive data from user inputs such as pointing devices, touch screens, and audio inputs, and may provide data to outputs, such as data to video drivers for formatting on displays, and data to audio devices.

Storage devices 320 are configured to exchange data with processor 310, and may store programs containing processor-executable instructions, and values of variables for use by such programs. Processor 310 is configured to access data from storage devices 320, which may include connecting to storage devices 320 and obtain data or read data from the storage devices, or place data into the storage devices. Storage devices 320 may include local and network accessible mass storage devices. Storage devices 320 may include media for storing operating system 322 and mass storage devices such as database 324 for storing data related to weather data, insured customer information and claims related data and information such as claim advance and settlement data.

Communications interface unit 312 may communicate via network 304 with other computer systems such as third party servers 308 and 309 as well as other internal and external servers, computer systems of remote sources of data, and with systems for implementing instructions output by processor 310. Insurance processing and data system 306 may also be configured in a distributed architecture, wherein databases, data storage devices and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Insurance processing and data system 306 may be or include wired or wireless local area networks and wide area networks, and over communications between networks, including over the Internet.

One or more public cloud, private cloud, hybrid cloud and cloud-like networks may also be implemented, for example, to handle and conduct processing of one or more transactions. Cloud based computing may be used herein to handle any one or more of the application, storage and connectivity requirements. For example one or more private clouds may be implemented to handle weather data and crowd sourcing data. Furthermore, any suitable data and communication protocols may be employed to accomplish the teachings of the embodiments herein.

Figure 7:
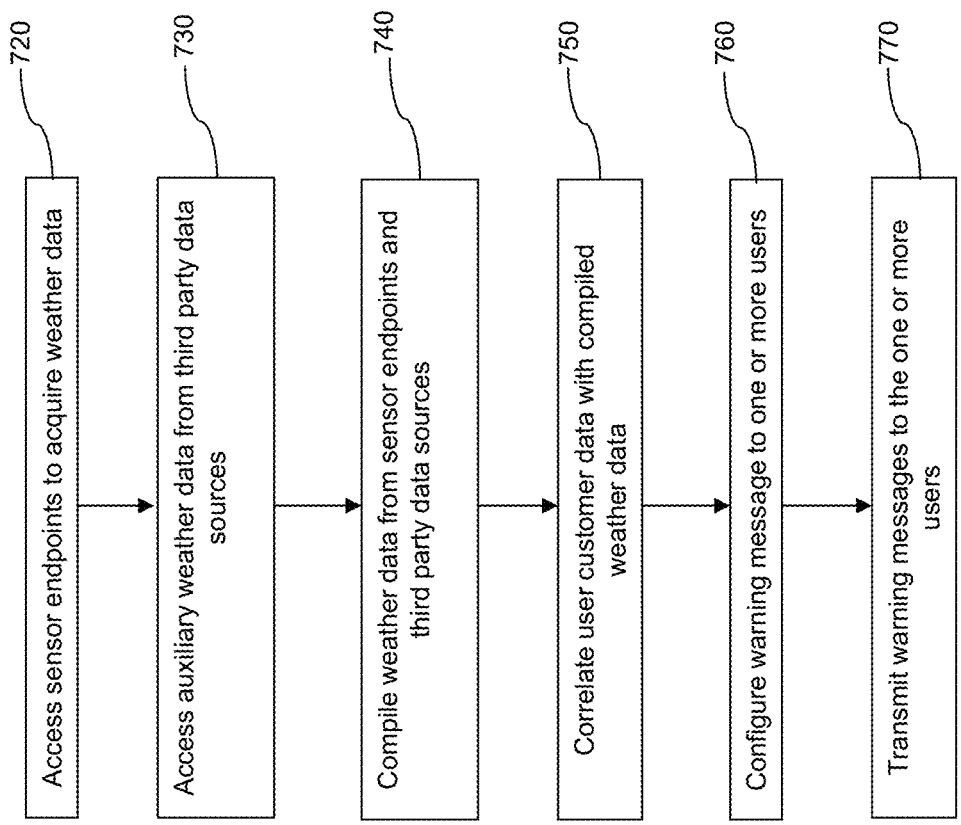
FIG. 7 shows exemplary method of the system and method of FIG. 1.

FIG. 7 illustrates an exemplary method 700 for enabling a reporting warning system in accordance with an embodiment. The method includes accessing sensor endpoints to acquire weather data, step 720. The method continues with accessing auxiliary weather data from third party data sources, step 730. The method continues with compiling weather data from sensor endpoints and third party data sources, step 740. The method continues with correlating user customer data with compiled weather data, step 750. The method continues with configuring warning messages to one or more users, step 760. The method further continues with transmitting warning messages to the one or more users, step 770. Optionally, method 70 may include providing feedback that protective measures were taken to prevent damage to property.

Figure 8:
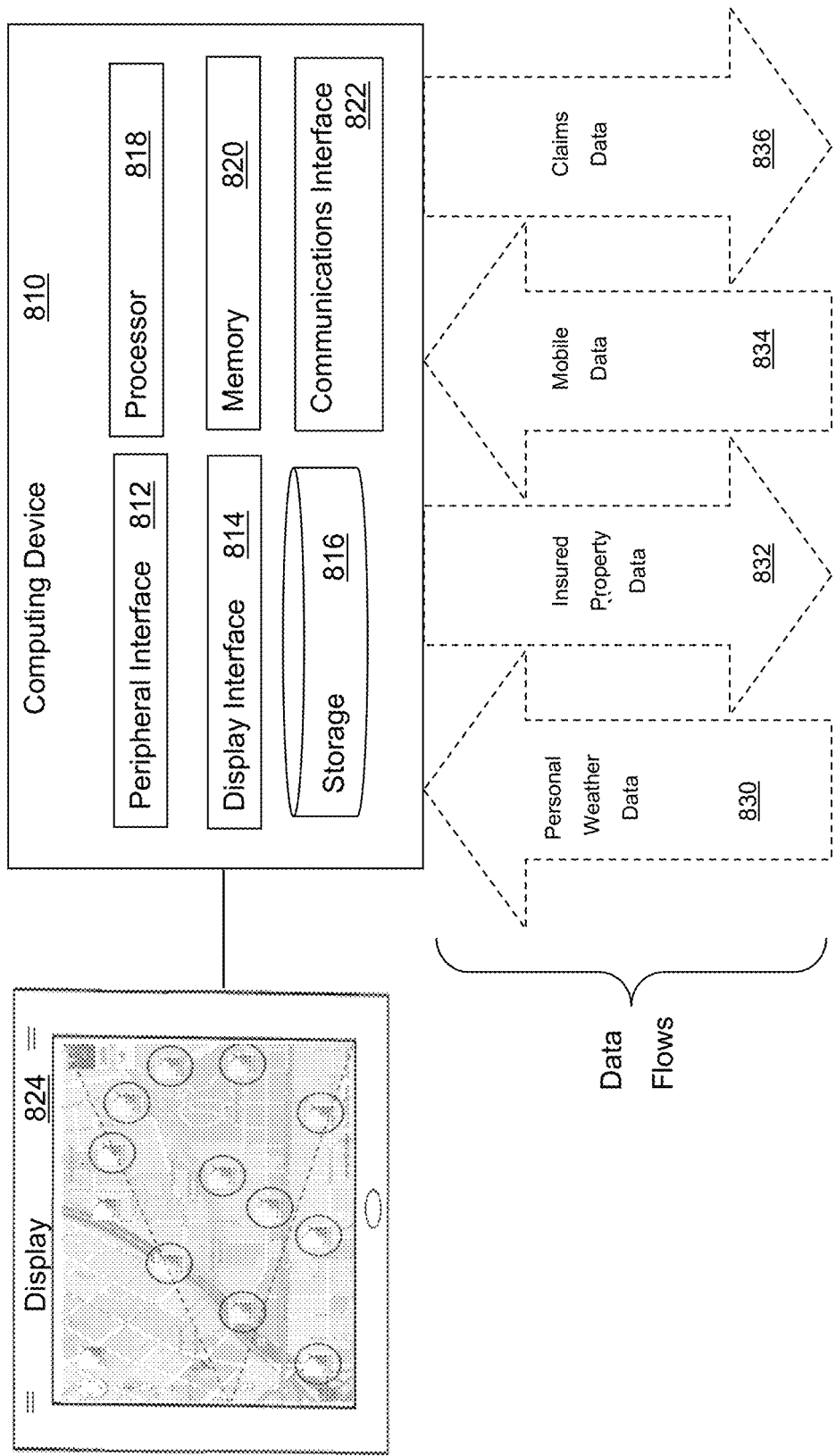
FIG. 8 shows the data flows of the exemplary device of the system and method of FIG. 1.

FIG. 8 shows an example computing device 810 that may be used to implement features describe above for managing weather related data in accordance with an embodiment. The computing device 810 may include a peripheral device interface 812, display device interface 814, a storage device 816, a processor 818, a memory device 820, and a communications interface 822. Computing device 810 may be coupled to a display device 824, which may be separately coupled to or included within the computing device 810. In operation, computing device 810 is configured to receive and transmit a number of data flows via communications interface 822 including, for example, personal weather data 830, insured property data 832, mobile data 834 and claims data 836 such as proactive risk mitigation information or first notice of loss information.

The peripheral device interface 812 may be an interface configured to communicate with one or more peripheral devices. The peripheral device interface 812 may operate using a technology such as Universal Serial Bus (USB), PS/2, Bluetooth, infrared, serial port, parallel port, and/or other appropriate technology. The peripheral device interface 812 may, for example, receive input data from an input device such as a keyboard, a mouse, a trackball, a touch screen, a touch pad, a stylus pad, and/or other device. Alternatively or additionally, the peripheral device interface 812 may communicate output data to a printer that is attached to the computing device 810 via the peripheral device interface 812.

The display device interface 814 may be an interface configured to communicate data to display device 824. The display device 824 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 814 may operate using technology such as Video Graphics Array (VGA), Super VGA (S-VGA), Digital Visual Interface (DVI), High-Definition Multimedia Interface (HDMI), or other appropriate technology. The display device interface 814 may communicate display data from the processor 818 to the display device 824 for display by the display device 824. As shown in FIG. 8, the display device 824 may be external to the computing device 810, and coupled to the computing device 810 via the display device interface 814. Alternatively, the display device 824 may be included in the computing device 810.

The memory device 820 of FIG. 8 may be or include a device such as a Dynamic Random Access Memory (D-RAM), Static RAM (S-RAM), or other RAM or a flash memory. The storage device 816 may be or include a hard disk, a magneto-optical medium, an optical medium such as a CD-ROM, a digital versatile disk (DVDs), or Blu-Ray disc (BD), or other type of device for electronic data storage.

The communication interface 822 may be, for example, a communications port, a wired transceiver, a wireless transceiver, and/or a network card. The communication interface 822 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 810 of FIG. 8 may be configured to perform any feature or any combination of features described above as performed by user devices 232a-n and 232 as described with respect to FIG. 5. In such an instance, the memory device 820 and/or the storage device 816 may store instructions which, when executed by the processor 818, cause the processor 818 to perform any feature or any combination of features described above as performed by the web browser module 234. Alternatively or additionally, in such an instance, each or any of the features described above as performed by the web browser module 234 may be performed by the processor 818 in conjunction with peripheral device interface 812, display device interface 814, and/or storage device 816, memory device 820, and communication interface 822.

Alternatively or additionally, an instance of the computing device 810 may be configured to perform any feature or any combination of features described above as performed by the insurance data system 210. In such an instance, the memory device 820 and/or the storage device 816 may store instructions which, when executed by the processor 818, cause the processor 818 to perform any feature or any combination of features described above as performed by the interface module 212 and/or the business rules module 214. In such an instance, the processor 818 may perform the feature or combination of features in conjunction with the memory device 820, communication interface 822, peripheral device interface 812, display device interface 814, and/or storage device 816.

Alternatively or additionally, an instance of the computing device 810 may be configured to perform any feature or any combination of features described above as performed by the system 220. In such an instance, the memory device 820 and/or the storage device 816 may store instructions which, when executed by the processor 818, cause the processor 818 to perform any feature or any combination of features described above as performed by the web application module 222 and/or the HTTP server module 224. In such an instance, the processor 818 may perform the feature or combination of features in conjunction with the memory device 820, communication interface 822, peripheral device interface 812, display device interface 814, and/or storage device 816.

Although FIG. 8 shows that the computing device 810 includes a single processor 818, single memory device 820, single communication interface 822, single peripheral device interface 812, single display device interface 814, and single storage device 816, the computing device may include multiples of each or any combination of these components 812, 814, 816, 818, 820, and 822 and may be configured to perform analogous functionality to that described above.

Figure 9:
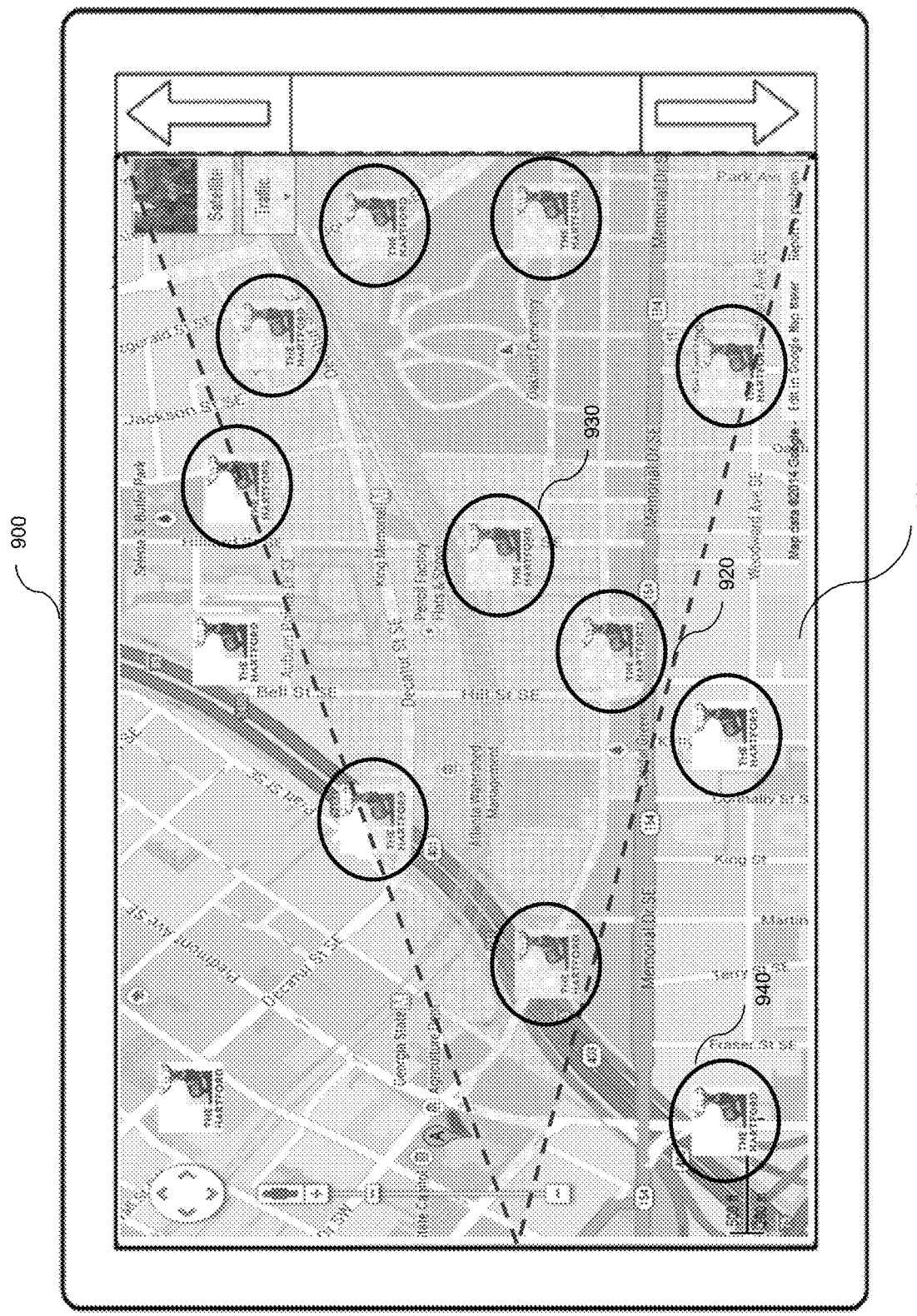
FIG. 9 shows an exemplary screen display of the system and method of FIG. 1.

FIG. 9 shows an example of a system operation and associated graphical user interfaces which may be displayed on a display screen of a mobile device 900 and an associated web page 910. In operation, the present invention may administer alerts as to weather conditions affecting certain users or insureds' property via the user interface. Web page 910 includes a coverage zone area 920 that may define an area having a weather condition in which alerts or warning message are transmitted to one or more users 930. One or more validated users 930 may be in the zone area 920 and others like user 940 may not be in the zone area 920 and may not receive a warning message in accordance with an embodiment. Users may be validated based on criteria such as whether they are an existing policyholder with a certain insurance company and/or whether they have a certain type of policy or policy coverage. The present embodiment may also be used to market to potential policyholders or customers such as by providing complimentary warning messages with an option to activate a policy.

Figure 10:
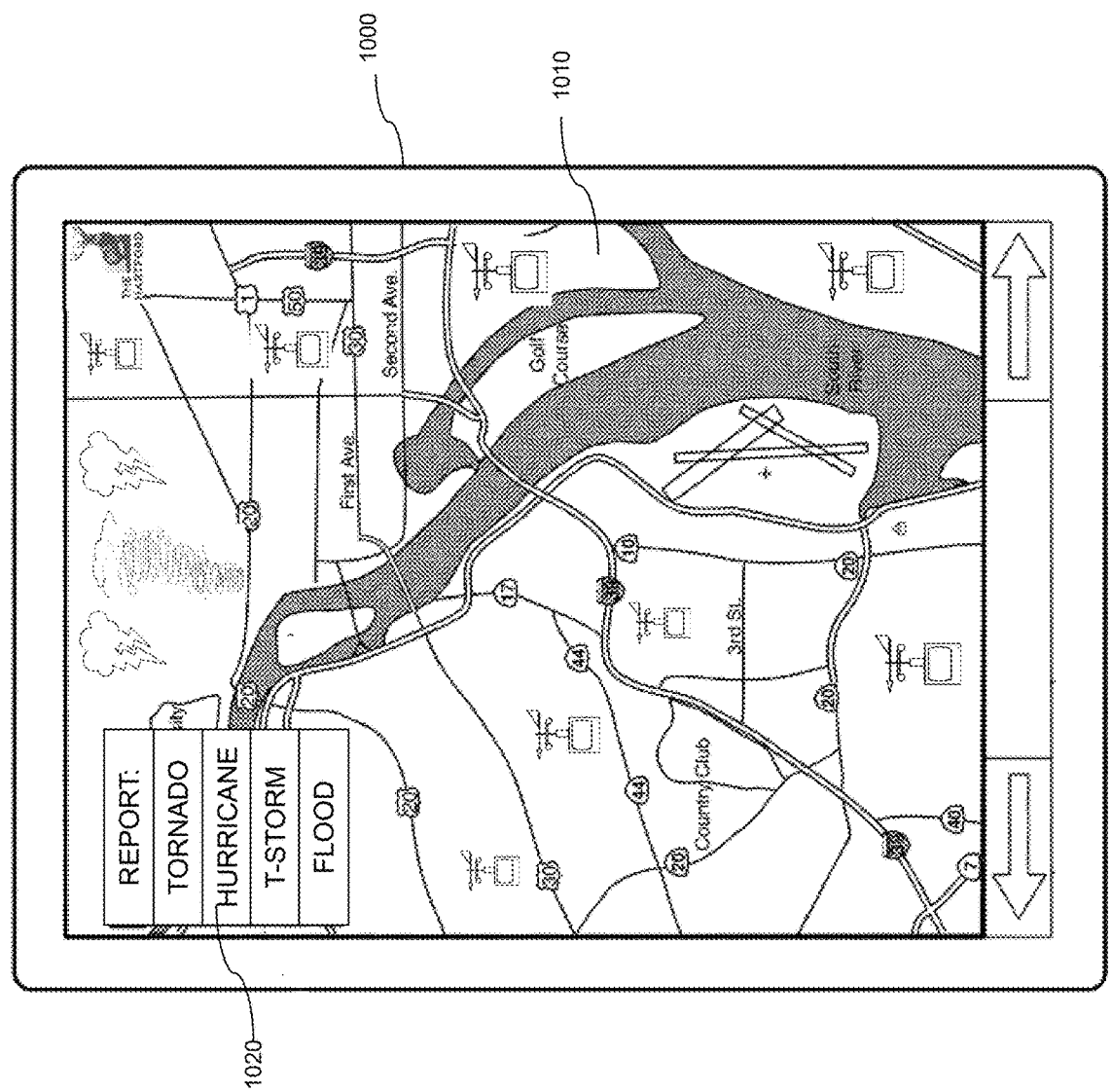
FIG. 10 shown an exemplary layout of a virtual mapping of the system and method of FIG. 1.

FIG. 10 shows an example of a graphical user interfaces which may be displayed on a display screen of a mobile device 1000 and an associated web page 1010. In operation, graphical user interface may facilitate reporting of weather conditions affecting certain users or insureds' property via the user interface such as within screen area 1020.

Utilizing the present embodiments a number of process and substantive areas are improved including: improved loss ratios, improved customer satisfaction and claims response; and enhanced resource and capital allocation. Note that the present system provides significant technical improvements to weather detection and warning systems. The teachings herein are directed to more than merely a computer implementation of a routine or conventional activity previously known in the industry as it significantly advances the technical efficiency, access and/or accuracy of weather detection and warnings by implementing a specific new method and system as defined herein. This is a specific advancement in the area of weather detection and warning by providing technical benefits in data accuracy, data availability and data integrity and such advances are not merely a longstanding commercial practice. Additionally, the teachings provide improvement beyond a mere generic computer implementation as it involves the processing and conversion of significant amounts of sensor data in a new beneficial manner as well as the interaction of a variety of specialized insurance, client and/or vendor systems, networks and subsystems.

Although the methods and features described above with reference to FIGS. 1-10 are described above as performed using the example architecture 10 of FIG. 1 and the exemplary system 200 of FIG. 5, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-10 may be used alone without the other features and elements or in various combinations with or without other features and elements. Sub-elements of the methods and features described above with reference to FIGS. 1-10 may be performed in any arbitrary order (including concurrently), in any combination or sub-combination.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

A user interface may comprise a device including an alphanumeric keypad, a touch screen, a fingerprint scanner, an optical scanner, a signature pad, a proximity detector, an audio recording device, a camera and any combination thereof.

What is claimed is:

1. A method for providing a warning system to protect insured property, the method comprising:
    accessing a plurality of devices to acquire weather data, the plurality of devices being spread throughout a geographic area;
    accessing third party weather data;
    compiling the third-party weather data and the device acquired data to determine at least one region of interest associated with the weather;
    correlating the region of threat with insured property to determine property that is endangered by the weather;
    configuring a warning message to ones of the plurality of devices associated with the endangered property; and
    transmitting the configured warning message to the ones of the plurality of devices.

2. The method of claim 1, further comprising receiving feedback from at least a portion of the ones of the plurality of devices to which the warning was transmitted, the feedback providing evidence that corrective measures were taken to lessen damage to endangered property.

3. The method of claim 2, wherein the feedback is used to reduce a premium associated with insurance for the endangered property.

4. The method of claim 1, wherein the property that is endangered is identified based on criteria associated with one or more insurance policies.

5. The method of claim 1, wherein the transmitted message includes proactive measures to protect property associated with the policyholders.

6. The method of claim 1, wherein the transmitted messages are delivered via a combination of audible and tactile delivery.

7. The method of claim 1, further comprising receiving at least one input on a screen of the ones of the plurality of devices to initiate a claim.

8. A system for providing a warning system to protect insured property, the system comprising:
    a plurality of devices being spread throughout a geographic area, the plurality of devices acquiring weather data;
    a processing unit, operating in conjunction with an input/output (I/O) device, to access third party weather data and to receive the acquired weather data from the plurality of device;
    the processing unit compiling the third-party weather data and the device acquired data to determine at least one region of interest associated with the weather;
    the processing unit correlating the region of threat with insured property to determine property that is endangered by the weather;
    the processing unit configuring a warning message to ones of the plurality of devices associated with the endangered property; and
    the processing unit, operating in conjunction with the I/O device, transmitting the configured warning message to the ones of the plurality of devices.

9. The system of claim 8, further comprising the processing unit, operating in conjunction with the I/O device, receiving feedback from at least a portion of the ones of the plurality of devices to which the warning was transmitted, the feedback providing evidence that corrective measures were taken to lessen damage to endangered property.

10. The system of claim 9, wherein the feedback is used to reduce a premium associated with insurance for the endangered property.

* * * * *